United States Patent [19]
Haberman et al.

[11] Patent Number: 5,291,316
[45] Date of Patent: Mar. 1, 1994

[54] INFORMATION DISPLAY SYSTEM HAVING TRANSPARENT HOLOGRAPHIC OPTICAL ELEMENT

[75] Inventors: David P. Haberman, Shorewood; Robert E. Rhoades, Waukesha, both of Wis.; Arthur Cox, Des Plaines, Ill.; Richard D. Rallison, Paradise, Utah

[73] Assignee: Astronautics Corporation of America, Milwaukee, Wis.

[21] Appl. No.: 766,720

[22] Filed: Sep. 27, 1991

[51] Int. Cl.[5] .......................... G02B 5/32; G03H 1/30
[52] U.S. Cl. ...................................... 359/13; 359/15; 359/25
[58] Field of Search .................. 359/13, 14, 15, 19, 359/20, 630, 22, 25

[56] References Cited

U.S. PATENT DOCUMENTS

| | | | |
|---|---|---|---|
| 3,949,490 | 4/1976 | Derderian et al. | 359/13 |
| 4,050,814 | 9/1977 | McFadden . | |
| 4,261,635 | 4/1981 | Freeman . | |
| 4,372,639 | 2/1983 | Johnson | 359/13 |
| 4,389,096 | 6/1983 | Hori et al. . | |
| 4,455,061 | 6/1984 | Case | 359/15 |
| 4,611,245 | 9/1986 | Trias . | |
| 4,798,426 | 1/1989 | Malcolm et al. . | |
| 4,818,048 | 4/1989 | Moss | 359/13 |
| 5,037,166 | 8/1991 | Malcolm et al. . | |
| 5,039,352 | 8/1991 | Mueller et al. | 359/19 |
| 5,144,459 | 9/1992 | Felske et al. | 359/630 |

FOREIGN PATENT DOCUMENTS

2211646  7/1989  United Kingdom ................. 359/13

OTHER PUBLICATIONS

A. D. Fisher, "A Review of Spatial Light Modulators," Technical Digest on Optical Computing Paper TuC1-1, OSA, 1985.

Arthur H. Firester, "Active-Matrix Addressing for TFT-LCDs," Information Display, Nov. 1987, pp. 11-14.

Tuckerman Moss, "Projection Displays: A New Wave for the Next Decade," Photonics Spectra, Aug. 1990, pp. 111-114.

Primary Examiner—Martin Lerner
Attorney, Agent, or Firm—Streich Lang

[57] ABSTRACT

An information display system has a display screen which is substantially transparent to a selected band of wavelengths of light and can be mounted on a window. A projector projects an image of light of the wavelengths to which the display screen responds onto the screen to reflect or transmit the selected wavelengths of light from the screen. The screen is formed as a holographic optical element which reflects the light such that an observer is able to see the projected image from the display screen only if his eyes are within a predetermined area, while observers outside of the area see only a substantially transparent display screen on the window.

11 Claims, 11 Drawing Sheets

INFORMATION DISPLAY SYSTEM HAVING TRANSPARENT HOLOGRAPHIC OPTICAL ELEMENT

FIELD OF THE INVENTION

This invention pertains generally to the field of information display systems such as heads-up type displays in which information is projected on a transparent or semi-transparent screen.

BACKGROUND OF THE INVENTION

Head-up display (HUD) systems have been developed for aircraft in which the pilot can view the surroundings of the aircraft through a transparent screen on which is superimposed additional visually observable information in either alpha-numeric or symbolic form. Various types of display screens have been proposed, including holograms which transmit light from a projector toward the position of the observer's eyes. An example of such a system is shown in the U.S. Pat. No. to Freeman, 4,261,635.

Holographic optical element systems have also been developed which utilize a hologram to reflect or transmit light from a projector to a specific design eye location, such as within a cockpit of an airplane. The image is redirected only to an area at which the viewer may observe the image and is not directed to other areas, as exemplified in U.S. Pat. Nos. 4,798,426 and 5,037,166 to Malcolm and Neuperger, the disclosures of which are incorporated herein by reference. The display screen is a holographic optical element which behaves as a reflector or transmitter of high efficiency for a specific, narrow bandwidth of light and which may be translucent or optically clear to all other visible light.

A typical projector for projecting light onto a holographic optical element display screen for cockpit type displays is a cathode ray tube (CRT) with a phosphor coating having a spectral emission at or near the responsive wavelength of the display screen, and a relay lens assembly. Such systems are effective since the CRT projector is mounted relatively close to the display screen and the pilot is seated close to the display screen. However, the light projected from the CRT may not be sufficient in situations where the display screen is more distantly spaced from the projector or from an observer than is typical in airplane cockpit situations, or where it is desired to have a display screen that is substantially larger than those typically contained within a cockpit.

SUMMARY OF THE INVENTION

The information display system of the present invention includes a display screen which is substantially transparent to all but a selected band of wavelengths of light, and which is adapted to form a transparent window or to be mounted on a transparent window. A projector projects an image of light of the wavelengths to which the display screen responds onto the display screen so as to reflect or transmit the selected wavelength of light from the screen. The display screen is preferably a holographic optical element which is formed so that an observer is able to see the projected image from the display screen only if his eyes are within a predetermined area. The holographic optical element or elements forming the display screen provide the image information to a designated conic section which forms the "design eye" of system users who are standing or moving around in the vicinity of the window, such as air traffic controllers in an airport control tower. The observer can still see a clear view of happenings occurring outside the window through the holographic optical element regardless of his position with respect to the element. At some positions, the observer will see only the surroundings outside the window through the optical element, while in other positions within the design eye region the viewer will see the surroundings with an image superimposed thereon as generated by the projector.

The holographic optical elements of the display screen preferably reflect messages to observers within a design eye box that has a well defined geometry and which provides a uniform presentation to the observer both in apparent brightness and in clarity. The display screen can be configured as a mosaic of multiple large holographic optical elements. The multiple holographic optical element mosaic may be designed to provide pertinent information to an observer which is keyed to his position with respect to the optical elements. For example, an observer standing or moving within a certain arc relative to the display screen may see information directed to him which is applicable to his field of view at that position. This reference field of view may change as the observer changes position and the mosaic display screen will reflect, to a new position, information from a different projector which is applicable to the new field of view. In this manner, unambiguous data can be presented with the field of view that is brought into focus by the observer at his position. The mosaic display screen is adapted to the human focus response by compartmentalizing presentation of information within multiple defined fields of view.

The information presentation system of the invention can be utilized in air traffic control tower windows, surface traffic management, information distribution and emergency management, military command and control applications such as heads-up display for aircraft, and ground mobile vehicle and naval surface vessel windows. The system of the invention is adaptable to any situation that has ports or windows used for observation, reference or targeting.

The projector of the information display system preferably includes a liquid crystal display (LCD) two-dimensional light shutter which creates computer driven "templates" that selectively pass light from a source into a focusing system which focuses and illuminates the image from the LCD light modulator and illuminates the holographic optical element display screen. The projector is preferably a modular system which can provide multiple throw distances to the display screen. In this manner, the projector can be adapted to different observational environments. The light source can be of various standard types, such as incandescent lamps and other specialized lamps, including infrared or standard color temperature lamps, or bright white light, which allows multiple applications and various user optical ambients. The LCD display is preferably a matrix addressable light shutter which can be driven by a computer without requiring the complexity of CRT based display drivers. The LCD module is preferably normally neutral and optically opaque but can be colored and correspondingly stacked in a multiple holographic optical element arrangement, thus providing a multi-color presentation to the observer. The projector may also be remote controlled by a small hand-held device or configured for automatic operation. The projector is driven by a computer which translates a variety of data inputs into the LCD light shutter control signals to control the image projected. The computer may be remote or may be incorporated in existing data and information systems. Preferably, the system includes the ability to automatically adjust the brightness of light from the projector to adapt to changing ambient light conditions.

Further objects, features and advantages of the invention will be apparent from the following detailed description when taken in conjunction with the accompanying drawings.

DETAILED DESCRIPTION OF THE INVENTION

Figure 1:
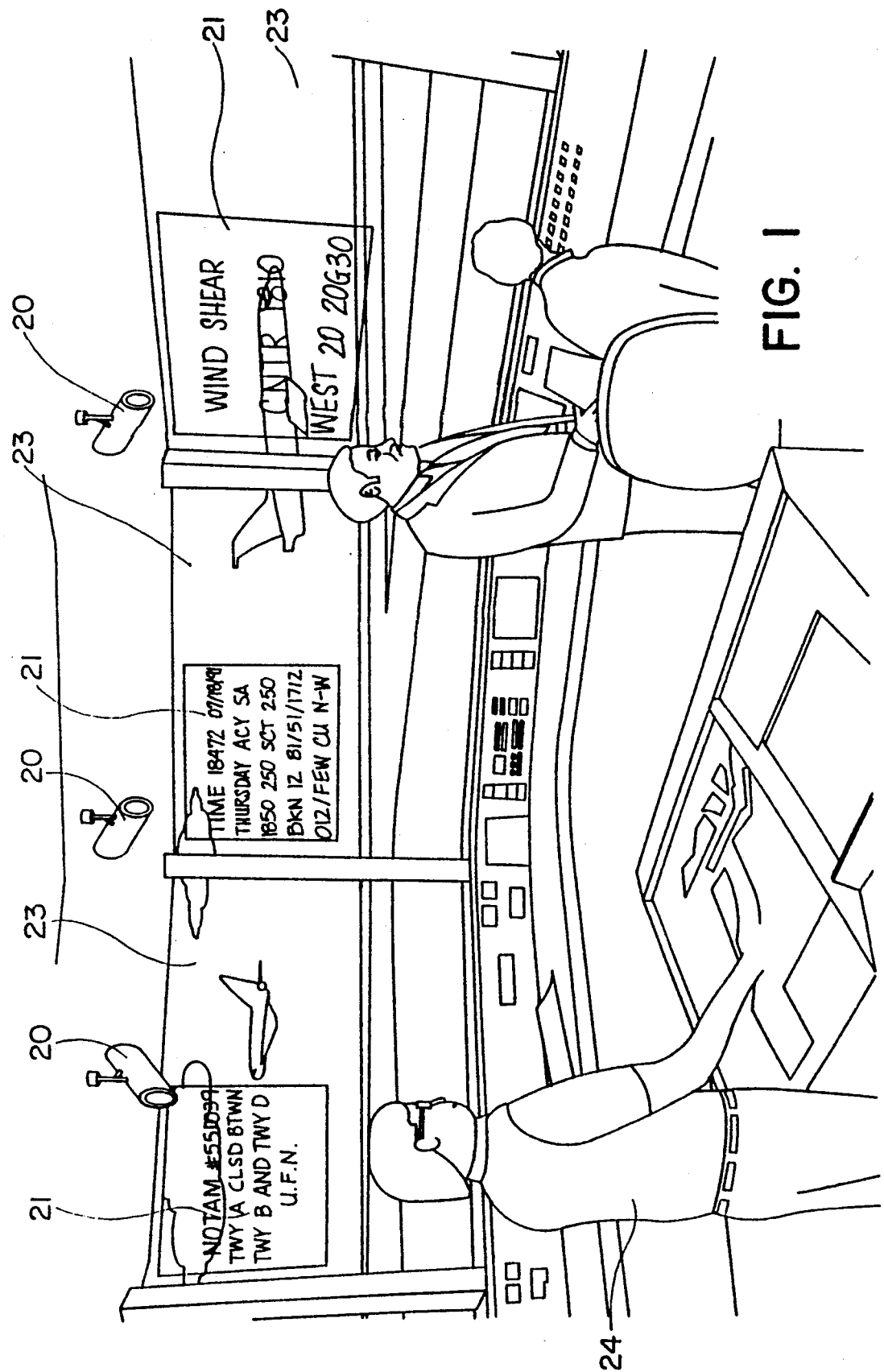
FIG. 1 is a pictorial view of an aircraft control tower incorporating the information display system of the invention.

The information display system of the present invention is particularly adapted for providing information to large viewing areas, such as areas of buildings in which there are large windows through which external objects and events can be viewed. An example of such an environment is the control tower of an airport, which is illustratively shown in FIG. 1. In this environment, there would be multiple windows 23 through which different views of the airport would be seen by the controllers within the control tower. An information display system in accordance with the invention may utilize several projectors 20, mounted to the building structure such as to the ceiling as shown, which project light conveying information toward holographic optical element display screens 21, which may each be mounted on a different one of the windows 23. The holographic optical elements 21 are, as shown, substantially transparent so that airplanes and other objects can be seen through them and through the transparent windows 23 on which they are mounted, while the visual information projected from the projectors 20 will show up at the desired design eye, for example, at the position of the observer 24 illustratively shown in FIG. 1. The projectors 20 provide light at a wavelength to which the holographic optical elements 21 are reactive so that such light energy is reflected back toward the observer 24, whereas substantially all other wavelengths of light are transmitted through the otherwise transparent display screens. The display screens 21 are preferably so constructed that light projected from the projector 20 is reflected back only toward the observer 24 at his designated position and not to other observers at other positions who may be moving around the room unless they move into the projection area of the observer 24. In this manner, the information being displayed on the display screen 21 will not interfere at all with the view of the other observers at other positions, who will see a substantially transparent element on the window 23 for an unobstructed view of events occurring outside the window.

Figure 2:
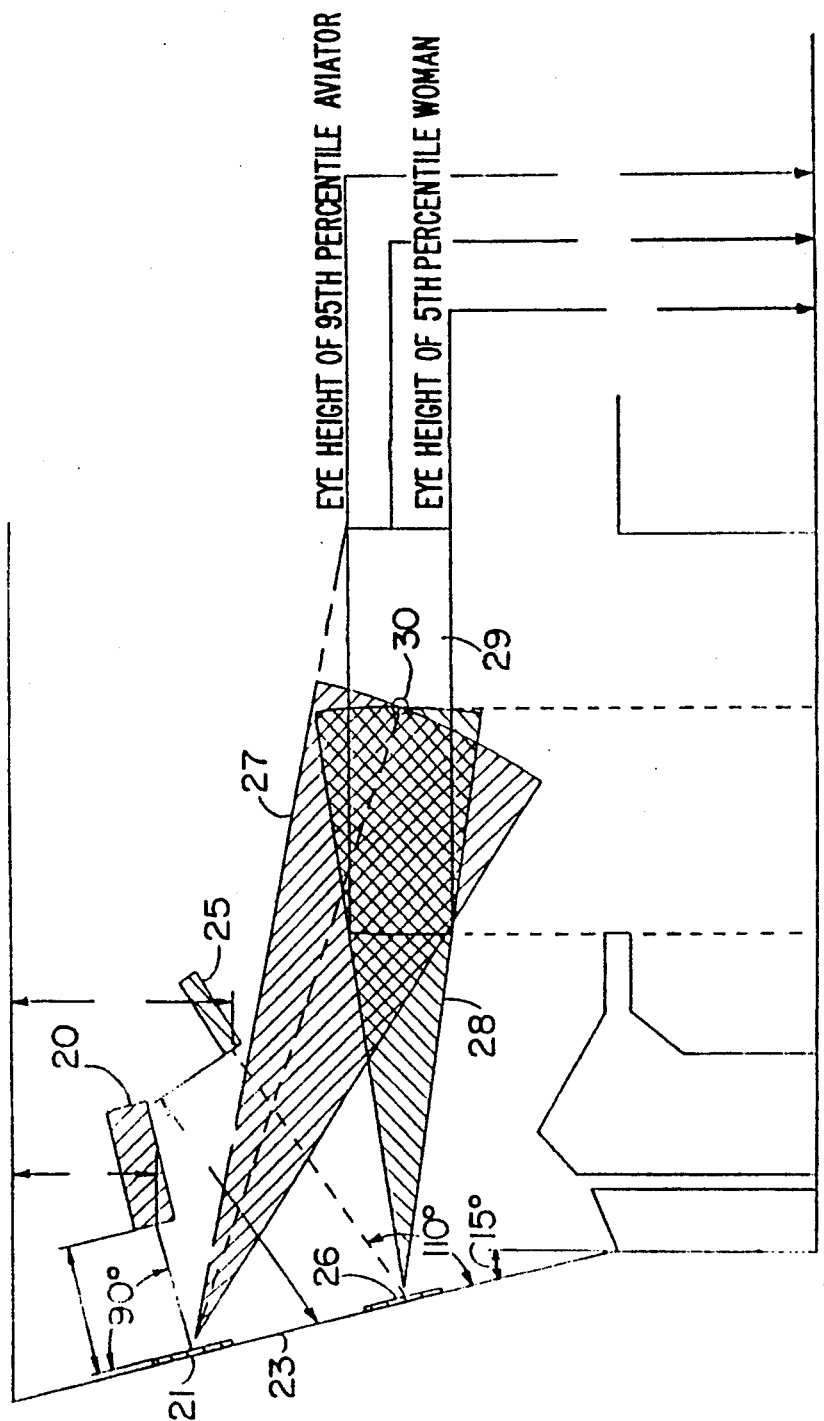
FIG. 2 is a schematic view of the relative positions of multiple projectors and display screens in an illustrative information display system in accordance with the invention.

The manner in which the information projected from the projectors 20 is received by an observer at a defined position is illustrated with respect to the schematic views of FIGS. 2-7. As shown in the side view of FIG. 2, light from an upper projector 20 reflecting off of the display screen 21 provides a cone 27 within which the image reflected from the display screen 21 can be viewed, with the design viewing area lying within a vertical box 29, the design eye region, which includes the preferred design eye position 30. More than one projector and display screen can be used. For example, as illustrated in FIG. 2, a second projector 25, which can be mounted below the projector 20, projects light off of a second holographic optical element 26, functioning as a display screen, which reflects within a cone 28 toward the design eye box 29 and particularly the design eye position 30.

Figure 3:
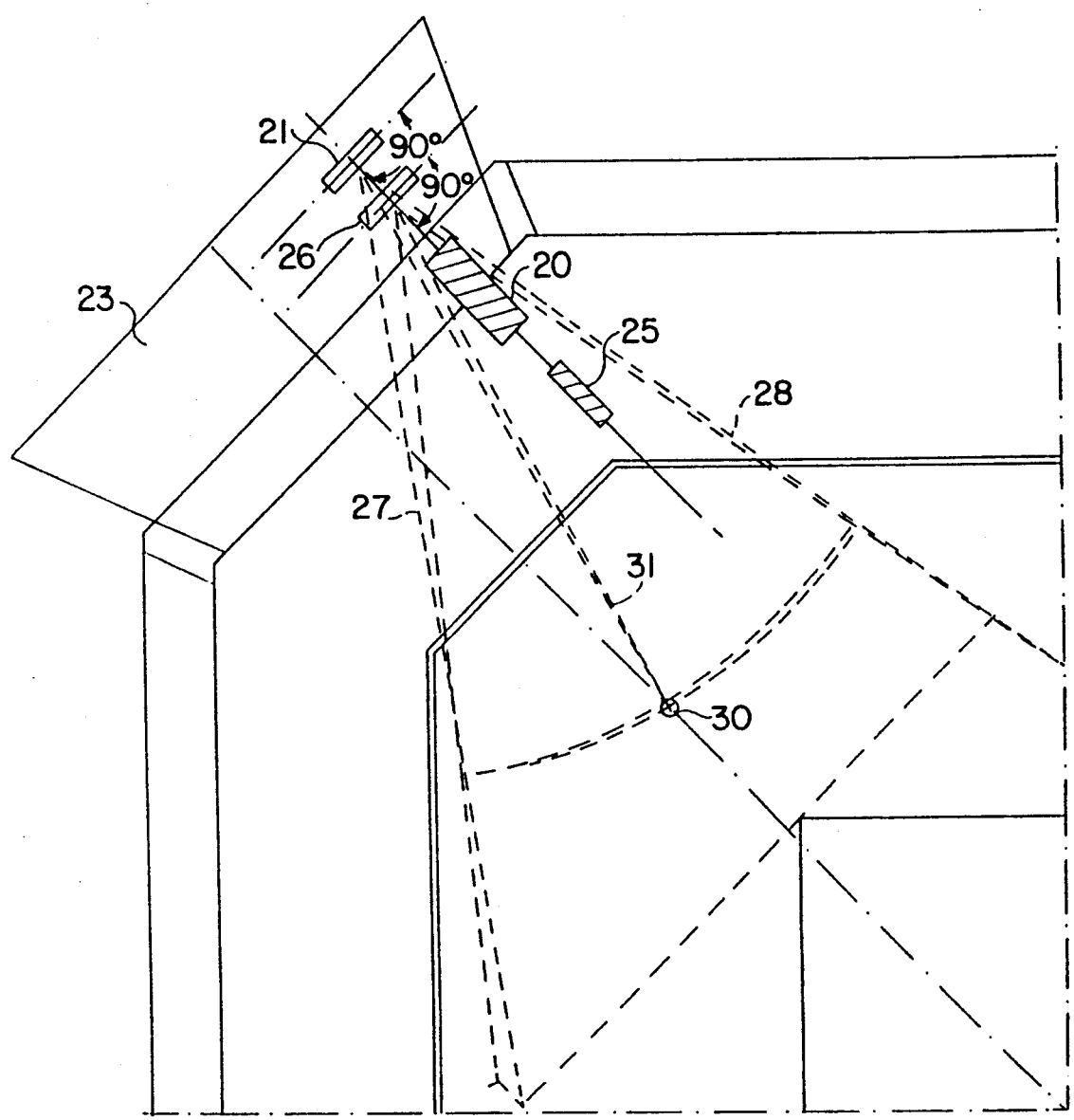
FIG. 3 is a top view of the multiple display screen system of FIG. 2.
Figure 6:
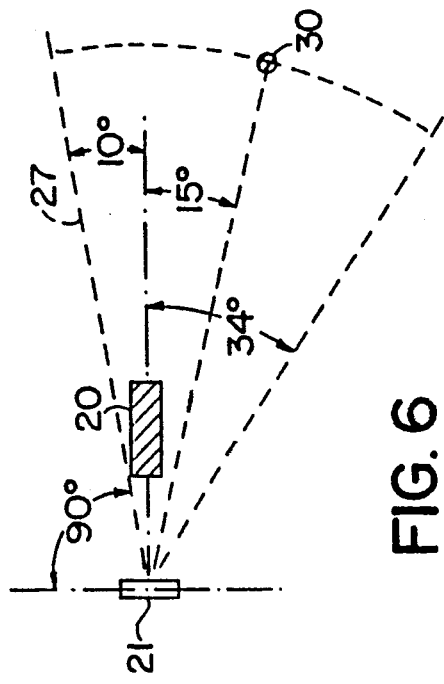
FIG. 6 is a top view of the upper projector and holographic optical element of FIG. 2 showing the horizontal viewing zone.
Figure 7:
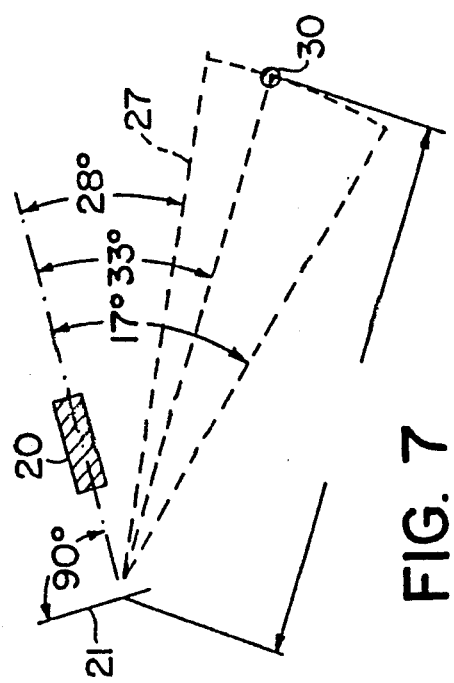
FIG. 7 is a side view of the upper projector and holographic optical element for the system of FIG. 2 showing the vertical viewing zone.
Figure 4:
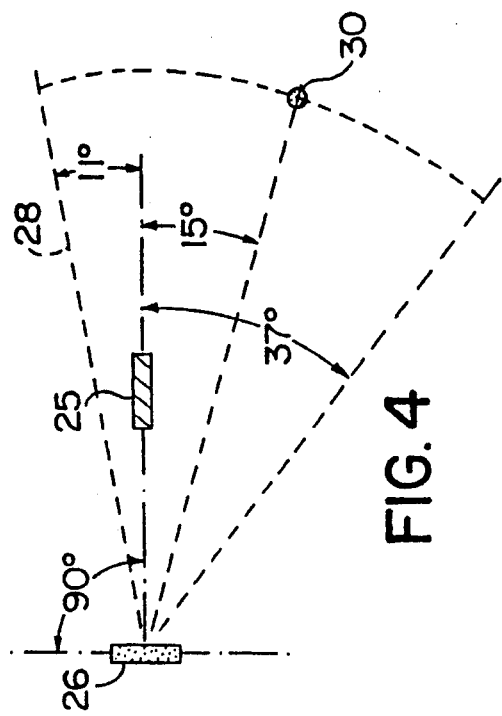
FIG. 4 is a schematic top view of the relative position of one of the projectors and holographic optical element display screens and the illustrative viewing zone for those elements.
Figure 5:
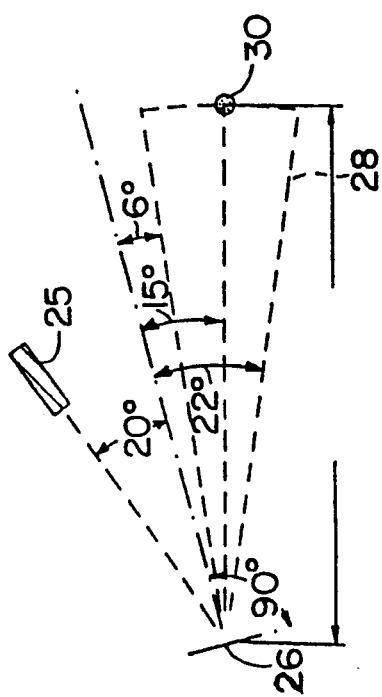
FIG. 5 is a schematic side view of the projector and holographic optical element of FIG. 4 illustrating the vertical viewing zone.

FIG. 3 is a vertical view of the same elements showing the manner in which the projectors project light toward the holographic optical elements, with the reflections from these elements being reflected back along a central axis 31 which is off the axis upon which the projectors 20 and 25 are aligned. The horizontal viewing zone for the projector 25 and holographic element 26 is illustrated in FIG. 4, while the vertical viewing zone for the projector 25 and holographic optical element 26 is illustrated in FIG. 5. The horizontal viewing zone for the projector 20 and holographic optical element 21 is illustrated in FIG. 6, whereas the vertical viewing zone for the projector 20 and holographic optical element 21 is illustrated in FIG. 7.

Figure 8:
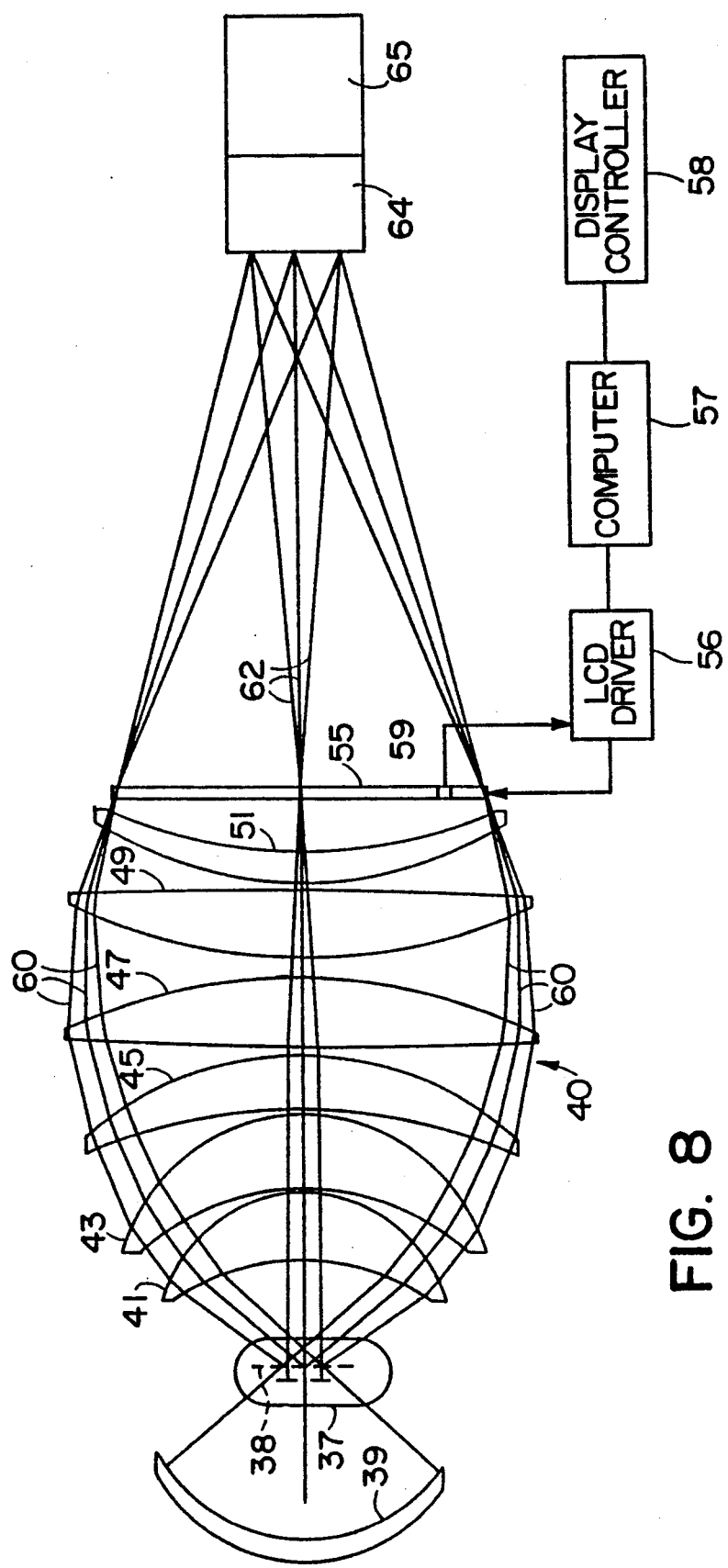
FIG. 8 is a somewhat simplified schematic view of the optical elements and the light path within the projector of the information display system of the invention.

A schematic drawing of a preferred construction for the projector 20 and the system which controls it is shown in FIG. 8. The projector utilizes a high intensity light source such as a lamp, e.g., a halogen quartz light, having a filament 38 which is backed by a rear reflector 39. Other light sources which may be used include CRTs and lasers. The light emitted forwardly from the filament 38 and that which is reflected from the reflector 39 is gathered by a condenser lens system 40 composed of a series of lenses 41, 43, 45, 47, 49, and 51 which gathers light and passes it through a two dimensional light modulator such as a liquid crystal display (LCD) unit 55 which is electrically addressable to selectively render various pixels in a two-dimensional matrix of the display opaque to the light passing therethrough. Other suitable two dimensional spatial light modulators which are electronically addressable may also be utilized. An example of a suitable LCD unit is an active matrix display produced by OIS Optical Imaging Systems, Inc., AMLCD Model 5-D-monochrome. The LCD unit is driven by an LCD driver unit 56 under control of a computer 57 which generates the signals representing the characters which are to be imaged on the display screens. The computer receives input information from the operator through a display controller 58, which may be a standard computer keyboard. As an example, the software for the computer 57 may be written in Microsoft C programming language and compiled and linked using the Microsoft toolset. This language and toolset are commercially available. The software is designed to run on a microcomputer, such as a Zenith 286 which uses a CGA monitor. The computer 57 sends structured message/symbol data to each projector via the parallel printer port on a dedicated parallel line to the LCD driver card 56. The driver includes an interface assembly which buffers the data and sends a conditioned signal to a controller assembly which stores the information and formats it into predefined screen layouts including the row and column addresses on the LCD. Each screen description is forwarded by serial signal to a row and column driver assembly which interprets and supplies the screen layout to the LCD. The software is designed to provide a flexible user defined shell which allows a data message to be entered and formatted at the computer for projection. This software is application specific because the information to be projected is defined by the user(s). The LCD driver card 56 may consist of a circuit design which receives data signals from the microcomputer 57, buffers the signals and converts them to discrete driver signals directed to the LCD edge connectors. Suitable drivers are Texas Instrument Part Numbers 3491 and 3492. The LCD unit 55 is used in the projector as a light shutter and has the ability to control the transmissivity of each pixel, high resolution (i.e., pixel density), and overall reliability. The preferred AMLCD is a thin film transistor type (TFT) LCD that has a discrete pixel element failure mode, which offers good system performance, service availability and reliability because random out pixels are tolerable and most messages are understandable even with out-pixels. If color displays are desired, an LCD unit having selectable color pixel capability may be utilized. If necessary, light transmissive characteristic of the LCD unit 55 can be compensated for temperature changes by utilizing a thermally responsive transistor 59 mounted to the LCD glass which sends a signal to the LCD driver 56 to (generally) increase the drive voltage to the LCD unit as its temperature rises.

The rays of light 60 at the edges of the lenses and the center ray 62, after passing through the optical modulator 55, impinge on the entrance pupil of a lens adaptor 64, which may include four lenses, which provides an adjustable throw distance for the projected image, e.g., 25 inches without the adaptor and 45 inches with the adaptor in place. After passing through the lens adapter 64, the light passes through a final focusing lens 65, e.g., a Rodenstock Rogonar-S, 210 mm, lens F4.5, before being projected to the holographic optical element display screen. The various lenses serve to focus the light projected from the projector onto the HOE. Coatings on the lenses of the condenser may be used to optimally pass the band of wavelengths of light desired, e.g., a band centered at about 550 nm for green light. The four lens element adapter 64 is a small module which is inserted into the projector assembly between the focus lens 65 and the LCD shutter 55. This module may be inserted into a pre-existing bracket (not shown) inside the chassis for the projector which fixes the module at a predefined distance in the optical path to allow the projector to excite a HOE at a 47 inch throw distance rather than a standard 25 inch throw distance. These lenses may be 3.5+/−0.02 inch diameter comounted in a metal brace which holds each lens in alignment. The brace may be approximately 2.2 inches in length and is attached by mounting screws into the projector. The lenses are optical glass equivalent to the quality of the lenses 41-51 in the projector.

In an exemplary construction for the projector, the rear reflector 39 may be formed of Pyrex glass having a 2 inch radius concave reflecting surface, 3.4 inch diameter, for a clear aperture of 3.3 inches, and a cold mirror coating on the concave surface. The following are exemplary lenses for a condenser 40 having a 25 inch throw distance:

Lens 41, first surface convex radius=1.71750 inches, THK=0.7800, refractive index'1.46008, Abbe No.=67.82, silicon dioxide glass, diameter=3.25 inches, clear aperture =3.15 inches, protective chamfer only, surface FIG. 5 rings 1.00 irregular over 3.00 inches; second surface radius =2.83334 inches concave, diameter=3.25 inches, clear aperture=3.00 inches, chamfer angle=0.00 degrees, surface FIG. 5 rings 1.00 irregular over 3 inches; specific gravity =2.210, weight=5.72 ounces, hot mirror coating on concave surface, high efficiency coating for 500-600 nm on convex surface.

Lens 43, first surface radius=2.21068 inches convex, THK=0.805, refractive index=1.46008, Abbe No.=67.82, silicon dioxide glass, diameter=4.2 inches, clear aperture =4.0 inches, protective chamfer only, surface FIG. 5 rings 1.00 irregular over 3.00 inches; second surface radius=2.84519 inches concave; diameter=4.2 inches, clear aperture =3.7 inches, chamfer angle=0.00 degrees, surface FIG. 5 rings 1.00 irregular over 3.00 inches; specific gravity 2.210, weight=11.132 ounces, surfaces coated with high efficiency coating for 500-600 nm.

Lens 46, first surface radius=3.63253 inches convex, THK=0.6500 inches, refractive index=1.52249, Abbe No.=59.48, glass type=K5, diameter=5.0 inches, clear aperture =4.85 inches, protective chamfer only, surface FIG. 5 rings 1.00 irregular over 3.00 inches; second surface radius =6.29644 concave, diameter=5.0 inches, clear aperture= 4.75 inches, protective chamfer only, surface FIG. 5 rings 1.00 irregular over 3.0 inches, specific gravity=2.590, weight=12.727 ounces, surfaces coated with high efficiency coating for 500 to 600 nm.

Lens 47, first surface radius=6.29644 inches convex, THK=0.7800, refractive index=1.52249, Abbe No.=59.48, glass type=K5, diameter=5.4 inches, clear aperture 5.3 inches, protective chamfer only, surface FIG. 5 rings 1.00 irregular over 3.00 inches; second surface radius=56.94761 inches convex, diameter=5.4 inches, clear aperture=5.3 inches, protective chamfer only, surface FIG. 5 rings 1.00 irregular over 3 inches; specific gravity=2.59, weight=15.418 ounces, surfaces coated with high efficiency coating for 500 to 600 nm.

Lens 49, first surface radius=6.29644 inches convex, THK=0.7800, refractive index=1.52249, Abbe No.=59.48, glass type=K5, diameter=4.4 inches, clear aperture=5.3 inches, protective chamfer only, surface FIG. 5 rings 1.00 irregular over 3.00 inches; second surface radius=56.65722 inches convex, diameter=5.4 inches, clear aperture=5.3 inches, protective chamfer only, surface FIG. 5 rings 1.00 irregular over 3.00 inches; specific gravity=2.59, weight =15.407 ounces, surfaces coated with high efficiency coating for 500 to 600 nm.

Lens 51, first surface radius=4.25007 inches convex, THK=0.3850, refractive index=1.52249, Abbe No.=59.48, glass type=K5, diameter=4.7 inches, clear aperture=4.55 inches, protective chamfer only, surface FIG. 5 rings 1.00 irregular over 3.00 inches; second surface radius=5.49239 inches concave, diameter=4.7 inches, clear aperture 4.4 inches, chamfer angle=0.00 degrees, surface FIG. 5 rings 1.00 irregular over 3.00 inches, specific gravity=2.590, weight=7.708 ounces, surfaces coated with high efficiency coating for 500 to 600 nm.

For an alternative condenser system having a 45 inch throw distance (the distance between the projector and the HOE), the following lens elements can replace the lenses 49 and 51:

First surface radius=6.29644 inches convex, THK=0.58, refractive index=1.52249, Abbe No.=59.48, glass type=K5, diameter=5.4 inches, clear aperture=5.3 inches, protective chamfer only, surface FIG. 5 rings 1.00 irregular over 3.00 inches; second surface radius=14.72754 inches convex, diameter=5.4 inches, clear aperture=5.2 inches, protective chamfer only, surface FIG. 5 rings 1.00 irregular over 3.00 inches; specific gravity=2.59, weight =13.901 ounces, surfaces coated with high efficiency coating for 500 to 600 nm. An alternative lens substituting for the lenses 49 and 51 in a 45 inch condenser system has a first surface radius=6.29644 convex, THK=0.58, refractive index =1.52249, Abbe No.=59.48, glass type=K5, diameter=5.4 inches, clear aperture=5.3 inches, protective chamfer only, surface FIG. 5 rings 1.00 irregular over 3.00 inches, second surface radius=30.02102 inches concave, diameter=5.4 inches, clear aperture=5.3 inches, protective chamfer only, surface FIG. 5 rings 1.00 irregular over 3.00 inches, specific gravity=2.59, weight=11.718 ounces, surfaces coated with high efficiency coating for 500 to 600 nm.

In the 25 inch condenser system, a preferred distance from the LCD unit 55 to the entrance pupil of the projection lens is 6.00 inches, and in the 45 inch condenser system an exemplary distance from the LCD unit 55 to the entrance pupil of the projection lens is 12.00 inches.

The condenser lens 40 provides a beam of homogeneous diffuse light to the LCD unit 55 which has been optically shaped to illuminate the LCD unit so that the image is formed on the HOE without distortion. The condenser unit 40 homogeneously spreads the light before it hits the LCD unit 55, which enables the desired non-distorted image to be achieved. The combination of these lenses results in a effective beam which provides optimal lighting to the LCD unit. Generally, the first two lens elements 41 and 43 diffuse the light energy from the bulb filament and reflector into a pre-defined optical path. Lenses 41, 43 and 45 also provide heat shielding to the remaining lenses and the LCD unit 55. Lenses 47, 59 and 51 function primarily as condenser lenses to maximize efficient distribution of light energy in the beam as it reaches the LCD unit. The lenses 41, 43, 45, 47, 49 and 51 are preferably coated, as noted above, to pass the desired wavelengths and to block substantially other wavelengths, including infrared and ultraviolet. It is also possible to obtain light of other colors by utilizing different lens coatings and/or by inserting a color filter in the condenser lens unit, for example, between the lenses 47 and 49.

The thermal management system for the projector preferably combines two methods. The lens system 40 is coated as described above to reflect wavelengths of light that would cause the LCD unit 55 to heat up, and this shielding is not subject to failure. Two fans (not shown) also provide dynamic thermal management by introducing cooling air to the projector and expelling heated air from a top duct. These fans cool both the driver circuitry and the LCD unit.

The high gain diffuse reflector holographic optical elements (HOEs), 21 and 26, also sometimes known as reflective directional diffusers, redirect energy from the projector for a specific narrow bandwidth of light. The HOEs are optically clear to all other wavelengths of visible light, and the diffuse reflecting properties of each HOE are optimized by concentrating the reflected light within a predetermined viewing zone. As an example, the HOEs can be optimized to reflect green light such as that produced by a cathode ray tube with a P43 phosphor which has a peak spectral emission at 544 nm.

The HOE may be "programmed" in fabrication to maximize the energy gain—response in any desired wavelength of incident light. HOES preferably optimize in the "green" portion of the spectrum for sunlight viewability; however, the HOEs may be layered with another color, such as red, which can be enabled by a filtered light from the projector. This allows the use of a daylight readable "green" responsive HOE, but also allows a different color display to be presented by simply applying a filter to the LCD in the projector's optics via a shutter. This results in the entire display surface reflecting green or red or another perceivable color back to the eye box. The HOE may also be partially programmed to reflect one color from part of the total display surface and another color from other parts of the display surface. This permits, for example, the top line of a multiline alphanumeric message to be permanently presented in red or yellow while the remaining portion of the HOE reflects the standard green. This flexibility in HOE applications allows color coding of message presentations without changing the projector or the data link. Colors may be predetermined by a human factors study that matches the HOE position and the operational sequence of message display to a standard color scheme which enhances the operator's situational cognizance.

The HOEs are designed to reflect light from a projector to a certain eye-box (i.e., presentation area) that is described by geometric angles in relation to the planar surface of the HOE, and provide a relatively broad, generally conical field of view. Multiple HOEs may be used together to provide a display surface that can present larger messages than can be accomodated by a single HOE. For example, two or more HOEs may be flush mounted next to each other and programmed to service the same eye-box. The operator's eye will integrate the negligible difference in the arc angle from one HOE to its immediate neighbor. A display surface may be constructed from a "mosaic" of HOEs each driven by a separate projector repeating the same information in real time. Two HOEs mounted side by side which use the methodology described above will supply twice the informational content to the same eye box. Brightness and angles of viewability have physical limits which are proportional to the amount of light energy which can be thrown by the projector. If a daylight readable HOE has a lateral angle of service which covers approximately 45 degrees, a larger eye-box (i.e., 90 degrees) can be accomodated by programming two HOEs with complementary angles and mounting them side by side. In this example, each HOE is programmed to reflect between a vector normal to the HOE plane and a vector almost parallel to it. A mosaic may also be used to service discrete eye-boxes which may or may not be next to each other. Each HOE reflects data to an eye-box which is pertinent to that operating position(s) in the tower. Thus, a user may stand in one eye-box and see data which is useful to him in his position in the tower, and this same user may reference the same relative position on the window as he moves to another eye-box and the data can change to reflect his informational requirements at his new station.

The HOEs utilized in the present invention can be formed in relatively large sizes, e.g., 12 inches on a side or greater. The HOEs provide viewing zones which have relatively uniform reflection within the viewing zone and brightness uniformity. The HOE screens preferably substantially transmit white light, e.g., 70% transmission or more, while acting as diffuse reflectors to light energy at the selected bandwidth. The HOEs in the present invention preferably have a significant gain with respect to the wavelength of light for which they are optimized, e.g., in the range of 25 or more. Gain for an HOE is defined as the area of a hemisphere at the viewing distance divided by the area of the viewing window, and is measured by dividing the luminescence of an image on the HOE by the luminescence measured from a reflectant standard. For example, the gain may be measured by illuminating the HOE optimized for P43 phosphor light at 544 nm from a CRT projector positioned at the locations of the projectors 20 and 25 as shown in FIG. 2. The luminance of the image is measured at the design eye position. A reflectance standard is then substituted for the HOE panel and the luminescence of the standard is measured at the design eye position. The gain is calculated by dividing the luminescence measured for the HOE with the luminescence measured for the reflectance standard.

The base for the HOE display screens may be constructed of various transparent materials, including optical quality plate glass and optical quality plastic material such as polymethyl methacrylate.

The HOEs can be mounted to the windows in various ways, or can be mounted on a frame held by a bracket (not shown) so that the HOE can be swung down into a position adjacent the window. In a preferred procedure for mounting the HOE to the window, a bead of room temperature vulcanizing (RTV) adhesive, commercially available from Dow Corning and other companies, is applied to the top vertical and two side edges of the inner face of the HOE. The HOE is then pressed tightly against the glass window for a sufficient time to allow the RTV to set. The RTV material provides a strong bond which does not deteriorate significantly with temperature changes and does not discolor on exposure to sunlight.

The formation of the HOEs can be carried out in various ways. Examples of the formation of diffuse reflecting HOEs are given in the aforesaid U.S. Pat. Nos. 4,798,426 and 5,037,166, the disclosures of which are incorporated herein by reference. As an exemplary structure, the holograms can be made in a dichromated gelatin layer that is 8–10 microns thick. As an example of the formation of such holograms, the layer was spun onto the transparent base material (e.g., plate glass) at 80 RPM from a mixture of 8 grams of ammonium dichromate, 30 grams of gelatin and 250 ml of water. The plates were exposed to 514 nm radiation until they produced bright green reconstructions, which typically requires 40 mj/cm$^2$. The plates were developed in Kodak fixer followed by water rinse and several agitated dunks in progressively hotter and dryer IPA. The HOEs were protected by lamination with Grace 15c UV epoxy and a cover plate. They were baked at 250° F. for one-half hour before capping to prohibit the trapping of moisture in the gelatin which would cause image degradation at a later time.

A particular preferred feature of the HOE screens is that they can be designed to reconstruct a focused image plane at a given distance. The HOEs can be produced by a standard image plane shift method of producing a diffuse reflector with a well defined energy aperture. One approach is a one-step process which requires specialized equipment, such as F#.6 lenses of 6 inch diameter. However, such a one-step process may only yield a multiplex master and would have to be about 1/20th scale to be practical to produce. To produce a larger screen, e.g., 12 inches by 12 inches, about 400 copies would be required.

A second method consists of controlling the energy aperture by stepping a narrow line of laser light across a plate while controlling the distance of the diffuse reflector behind the plate. However, the method only works for one axis and is always symmetric.

The most general way to make energy aperture screens is to make a hologram of the screen from a distance about equal to the viewing distance, and then image plane shift the screen back to the film plane in a second generation copy which can then be duplicated by contact copying a third generation. This method requires a convergent or collimated reconstruction beam equal in size to the energy aperture. If one is not used, then considerable distortion in the energy aperture can occur and a converging reconstruction beam is required for the copies unless a third generation master is used for final copies. The practical size of a converging reference beam determines the maximum scale. For example, using an 8 inch diameter lens and enough optical laser power to use it, a 1/12th scale produces an aperture of 1.9 by 6.3 inches at a distance of 6.6 inches. This will produce a perfect screen of 1 by 1 inches and can be duplicated to produce a larger screen, e.g., 144 times to produce a 12 inch ×12 inch screen. Alternatively, a slightly larger screen, such as 1.5 inches by 1.5 inches can be utilized, which reduces the number of elements required to 64.

A larger screen is produced by multiplexing a master over the entire desired area of the screen, either optically or mechanically. The master can be made a little oversize to allow masking off of part of it to reduce the angular extent of the energy in the copies. Utilizing a step and repeat camera, it is possible to use a transmission master rather than a reflection master to obtain broader control of the reference and reconstruction beams. The key to good screens is the precision with which the sections can be pieced together. Mask masters and plates must be perfectly aligned and perfectly stepped and repeated.

It is also possible to make a submaster, e.g., a 6 inch by 6 inch array, and copy it a lesser number of times to make a larger array, e.g., four times to produce a 12×12 inch plate. Once the first copy is produced, a good quality final copy can serve as a one step master for the following copies, making production no more difficult than the production of one shot master copies. Several problems and advantages of scaling and multiplexing can be noted.

First, the master must be illuminated for copying with a converging wave that is a faithful conjugate of the original construction wave, or both must be well collimated. Otherwise, distortions can appear in the energy aperture, and the image appears to roll, curve and leave the film plane. Distortion is minimized by making the cells to the correct or a smaller scale. A larger scale will produce more noticeable distortion and rougher cutoff boundaries. Precise registration of masks and masters are not necessary to make precise copies. The present method is completely general and is adjustable from master to copy, and virtually any size or shape of aperture can be made this way although requiring more fixturing and machine structure. The size of the final screen is not limited by the size of the optics or the available laser power.

The diffuse nature of the hologram places some constraints on the efficiency because noise increases rapidly as the efficiency goes above 90% peak for any diffuse recording. Intermodulation noise and bulk scattering will tend to produce fogginess in the transmission characteristics of the HOE for efficiencies over 80% in daylight.

Figure 9:
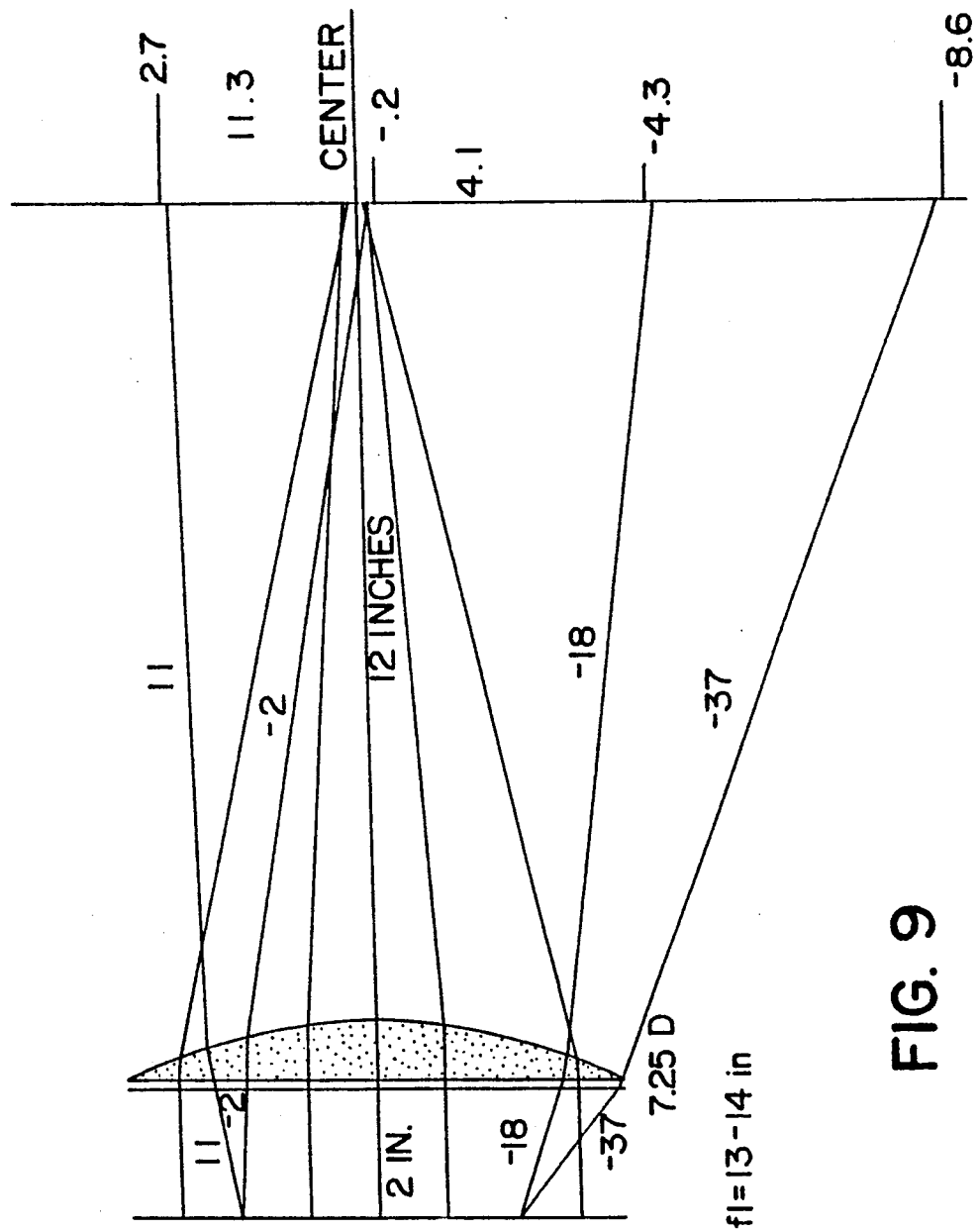
FIGS. 9-11 are illustrative ray traces of the optics system for forming the holographic optical element.
Figure 10:
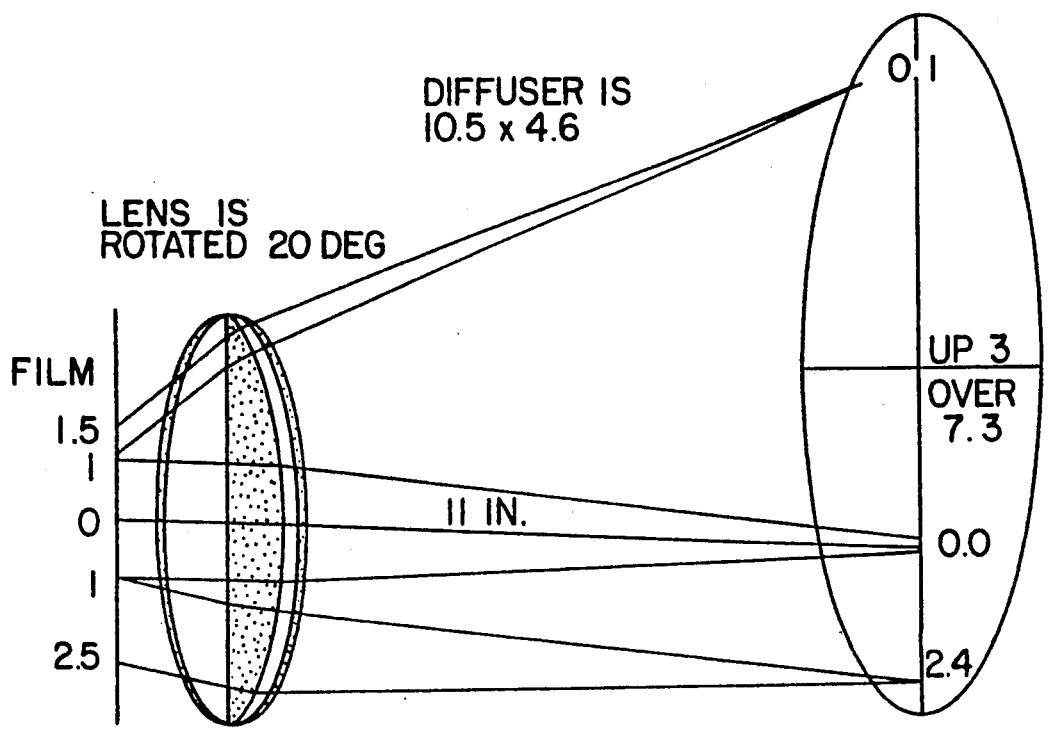
Figure 11:
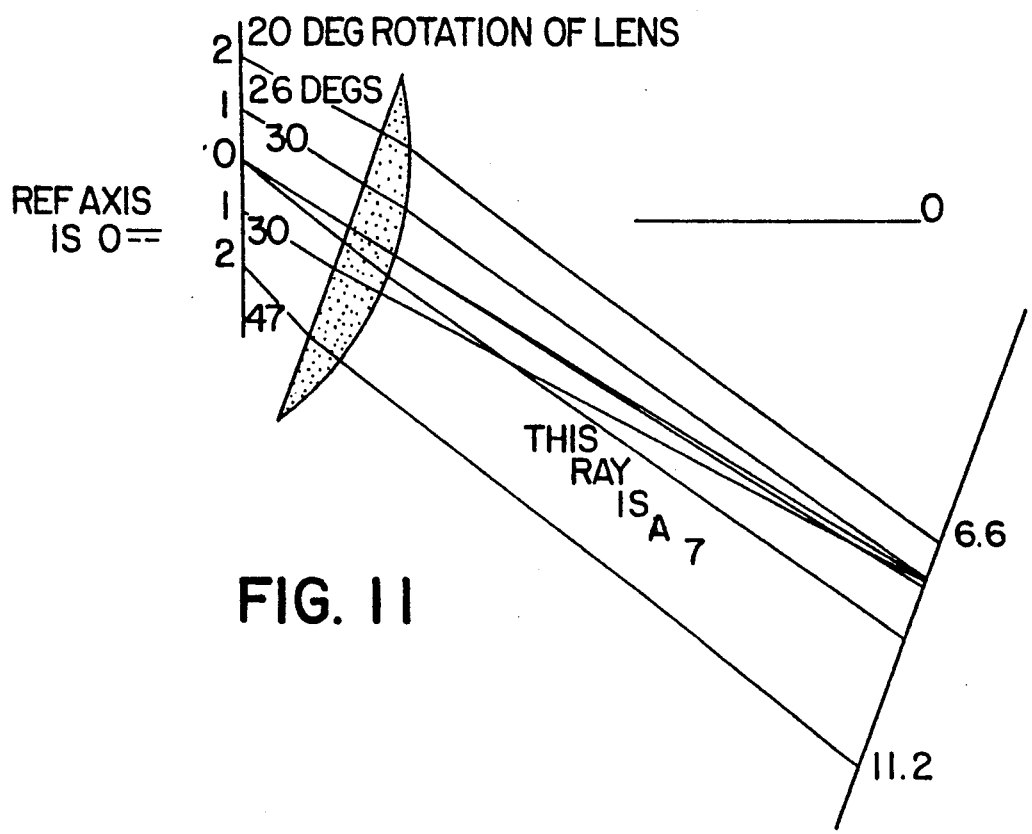
Figure 12:
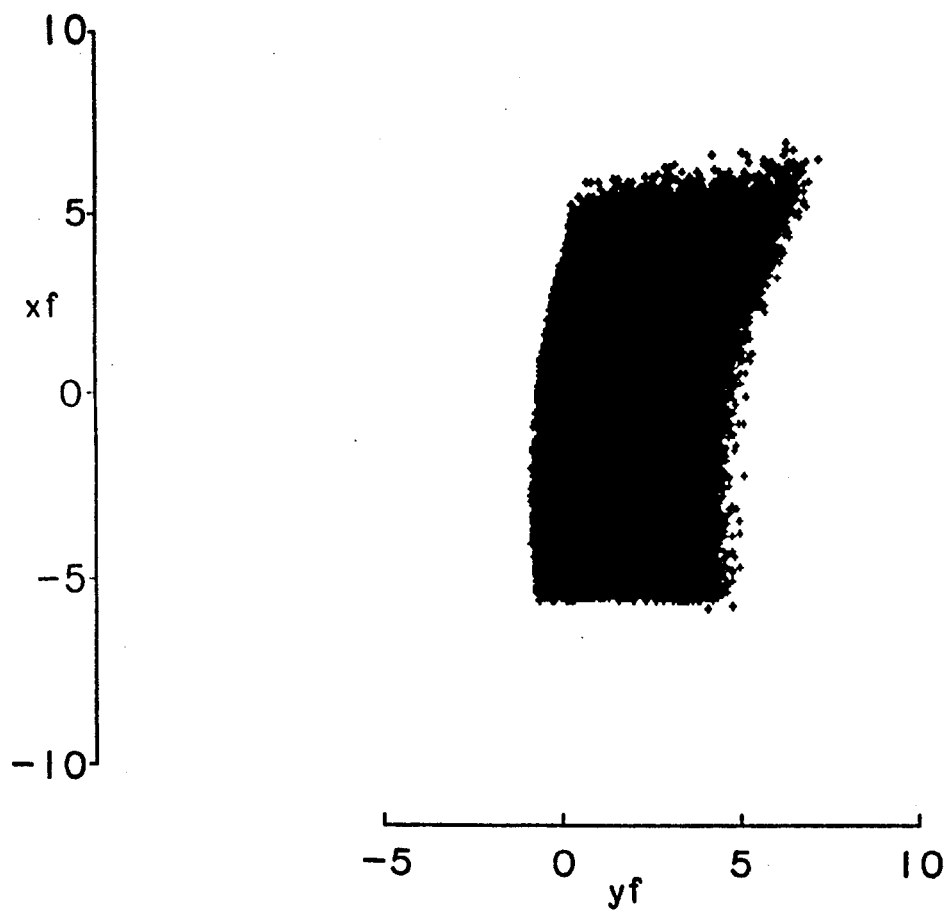
FIG. 12 is an illustrative drawing of an exemplary shape of a diffuser for use in forming the holographic optical elements.

FIGS. 9-11 show exemplary ray traces for an HOE display screen formation and FIG. 12 shows the shape and scale of the diffuser necessary to cover a particular exemplary angular area. One procedure for making the multiplexes is to advance a gaussian beam stepwise in one inch increments over the area desired, e.g., 144 square inches for a 12 inch by 12 inch screen. A master of about 10 square inches is moved along with the beam so that the edges of the master are never illuminated by much of the gaussian beam, which is mostly contained in 4 or 5 square inches. As seen from FIGS. 9-11, the master is made in such a way that the reflected image from the screen is focused at or near infinity.

Figure 13:
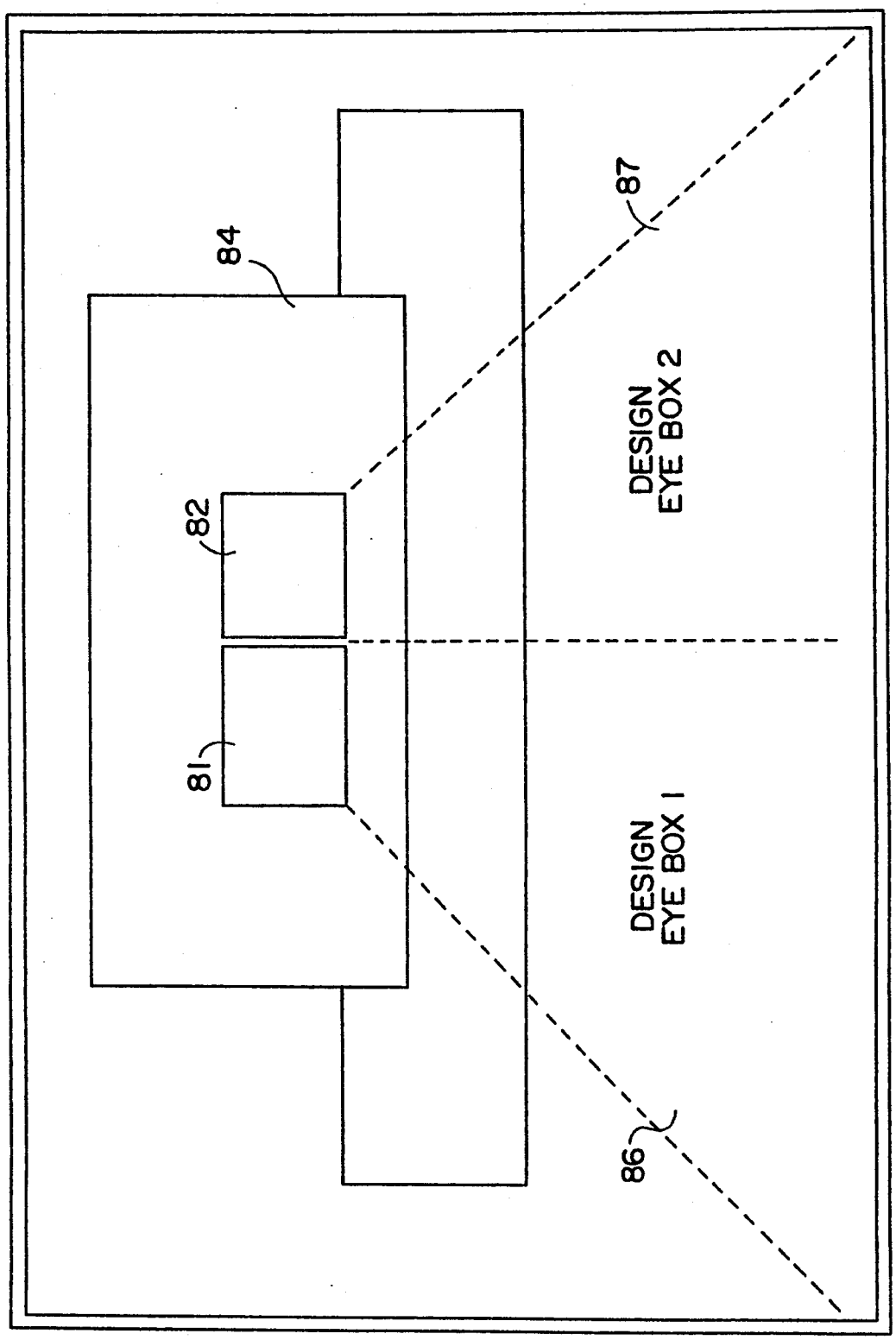
FIG. 13 is a schematic view of a two HOE mosaic system.

FIG. 13 illustrates a simple way two HOE mosaic composed of HOEs 81 and 82 on a window 84 which is programmed to have the same information repeated to two horizontally adjacent eye boxes 86 and 87. A user is thus able to reference a display presentation from a broad range of positions. The advantage of the mosaic is that each HOE services a programmed area that allows a focused—bright presentation, which optimizes the use of available light energy from each dedicated projector. A single data stream from the system computer is simply repeated to run this implementation.

Figure 14:
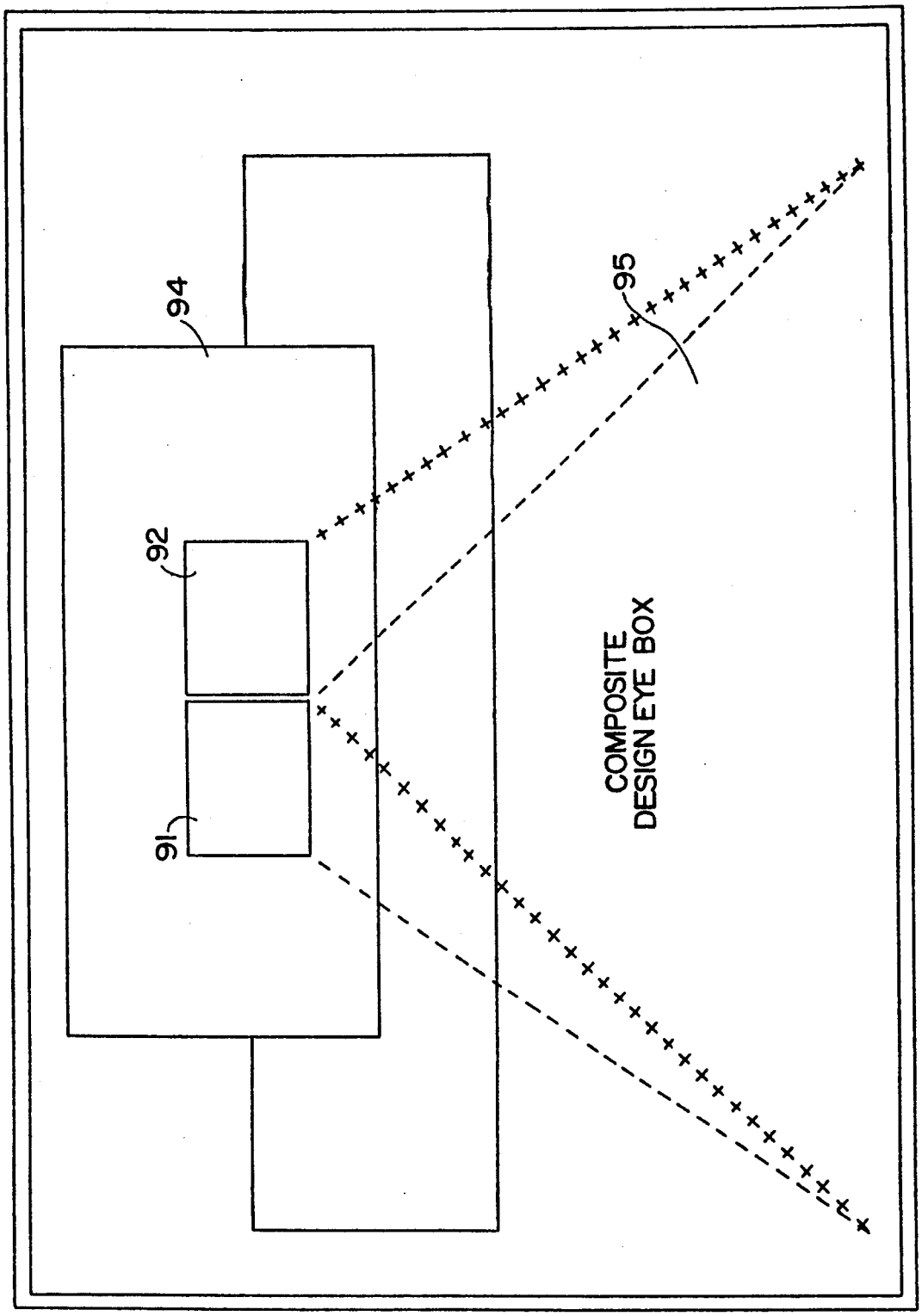
FIG. 14 is a schematic view of a two HOE mosaic system which presents a composite display to a broad eye box.

FIG. 14 illustrates a simple two HOE mosaic composed of HOEs 91 and 92 on a window 94 which is programmed to present a composite display to a broad eye box 95. This geometry provides twice the information content to the design eye box. This concept can be extended to any number of HOEs. The advantage of using multiple HOEs to present data to a composite design eye box is that the display system does not limit message content.

Figure 15:
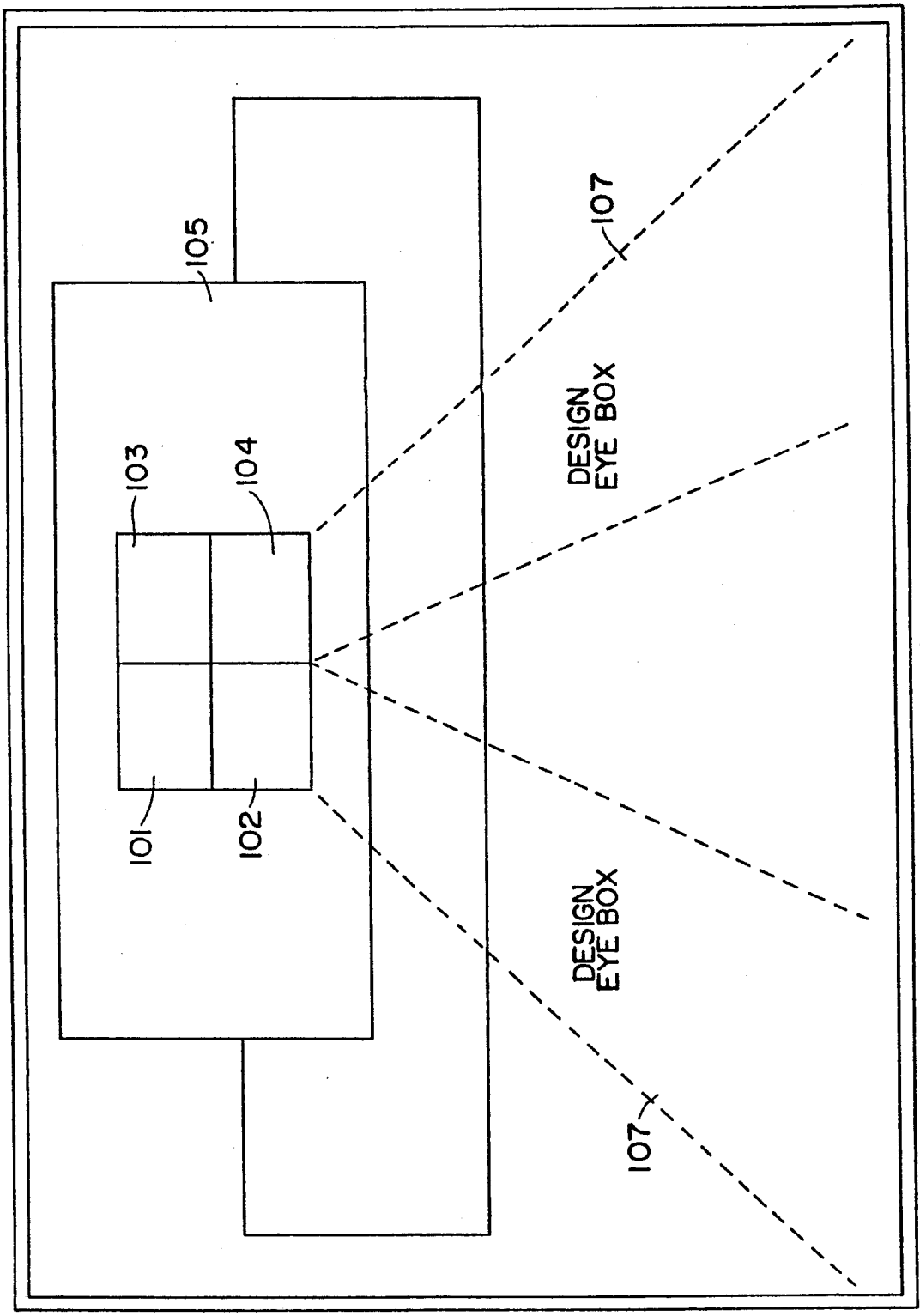
FIG. 15 is a schematic view of a multiple HOE mosaic system.

FIG. 15 illustrates the provision of composite messages of various sizes on HOEs 101-104 mounted on a window 105 which reflect light to more than one discrete design eye box 106 and 107. This geometry enables the system to segregate data and customize messages to different operator positions. Another important advantage is that there is not confusion due to "data leakage" between design eye boxes (operator positions), thus providing an integrated display system which can simultaneously provide different data to different positions/users.

It is understood that the invention is not limited to the particular embodiments set forth herein as illustrative, but embraces such modified forms thereof as come within the scope of the following claims.

What is claimed is:

1. An information display system for use in providing information displays on windows of a building comprising:
   (a) a viewable transparent display screen including a holographic optical element mounted on a window of the building, the holographic optical element being substantially transparent to most wavelengths of light and formed to act as a diffuse reflector of light at a selected band of wavelengths such that light from the holographic optical element is reflected only into a predetermined view zone bounded by predetermined left and right angles in a horizontal plane orthogonal to the plane of said holographic optical element and bounded by predetermined upper and lower angles in a vertical plane orthogonal to the plane of said holographic optical element; and
   (b) a projector mounted to a structure of the building to product an image at the selected band of light wavelengths which the holographic optical element reflects, and which projects and focuses the image onto the holographic optical element to provide the image to the predetermined viewing zone and such that observers outside of the predetermined viewing zone do not see the image;
   wherein the building has multiple windows which provide different views to observers, wherein there are a plurality of holographic optical elements mounted to different windows so as to provide different views to an observer through the holographic optical elements and out the window, and a plurality of projectors each focusing an image onto a separate one of the holographic optical elements to provide images on such holographic optical elements which are appropriate to the views seen by the observer out the window through the holographic optical element.

2. An information display system for use in providing information displays on windows of a building comprising:
   (a) a viewable transparent display screen including a holographic optical element mounted on a window of the building, the holographic optical element being substantially transparent to most wavelengths of light and formed to act as a diffuse reflector of light at a selected band of wavelengths such that light from the holographic optical element is reflected only into a predetermined viewing zone bounded by predetermined left and right angles in a horizontal plane orthogonal to the plane of said holographic optical element and bounded by predetermined upper and lower angles in a vertical plane orthogonal to the plane of said holographic optical element; and (b) a projector mounted to a structure of the building to produce an image at the selected band of light wavelengths which the holographic optical element reflects, and which projects and focuses the image onto the holographic optical element to provide the image to the predetermined viewing zone and such that observers outside of the predetermined viewing zone do not see the image;

wherein the holographic optical element is created by a step and repeat process to create a matrix from a master hologram, which is used to produce a single hologram in a scalable range of sizes forming the holographic optical element programmed to reflect light at the selected band of wavelengths into said predetermined view zone regardless of the physical size of the holographic optical element.

3. An information display system for use in providing information displays on windows of a building comprising:

(a) a viewable transparent display screen including a holographic optical element mounted on a window of the building, the holographic optical element being substantially transparent to most wavelengths of light and formed to act as a diffuse reflector of light at a selected band of wavelengths such that light from the holographic optical element is reflected only into a predetermined viewing zone bounded by predetermined left and right angles in a horizontal plane orthogonal to the plane of said holographic optical element and bounded by predetermined upper and lower angles in a vertical plane orthogonal to the lane of said holographic optical element; and (b) a projector mounted to a structure of the building to produce an image at the selected band of light wavelengths which the holographic optical element reflects, and which projects and focuses the image onto the holographic optical element to provide the image to the predetermined viewing zone and such that observers outside of the predetermined viewing zone do not see the image;

wherein there are plural holographic optical elements mounted to the window adjacent to one another and associated plural projectors projecting images to each of the holographical optical elements, each holographic optical element formed to reflect the image focused thereon to the same predetermined viewing zone so that an observer in the predetermined viewing zone will see the images from each of the holographic optical elements whereas the images will not be seen by observers outside the predetermined viewing zone.

4. An information display system for use in providing information displays on windows of a building comprising:

(a) a viewable transparent display screen including a holographic optical element mounted on a window of the building, the holographic optical element being substantially transparent to most wavelengths of light and formed to act as a diffuse reflector of light at a selected band of wavelengths such that light from the holographic optical element is reflected only into a predetermined viewing zone bounded by predetermined left and right angles in a horizontal plane orthogonal to the plane of said holographic optical element and bounded by predetermined upper and lower angles in a vertical plane orthogonal to the plane of said holographic optical element; and (b) a projector mounted to a structure of the building to produce an image at the selected band of light wavelengths which the holographic optical element reflects, and which projects and focuses the image onto the holographic optical element to provide the image to the predetermined viewing zone and such that observers outside of the predetermined viewing zone do not see the image;

wherein the holographic optical element is mounted on the window of the building by adhering the element to the window with a transparent adhesive; and wherein the adhesive is room temperature vulcanizing material which is applied to a back face of the holographic optical element adjacent edges of the element.

5. An information display system for use in providing information displays on windows of a building comprising:

(a) a viewable transparent display screen including a holographic optical element mounted on a window of the building, the holographic optical element being substantially transparent to most wavelengths of light and formed to act as a diffuse reflector of light at a selected band of wavelengths such that light from the holographic optical element is reflected only into a predetermined viewing zone bounded by predetermined left and right angles in a horizontal plane orthogonal to the plane of said holographic optical element and bounded by predetermined upper and lower angles in a vertical plane orthogonal to the plane of said holographic optical element; and (b) a projector mounted to a structure of the building to produce an image at the selected band of light wavelengths which the holographic optical element reflects, and which projects and focuses the image onto the holographic optical element to provide the image to the predetermined viewing zone such that observers outside of the predetermined viewing zone do not see the image;

wherein a window of the building has two holographic optical elements mounted thereon, one vertically higher than the other, and two projectors, one forming an image on the upper holographic optical element and the other forming an image on the lower holographic optical element, the holographic optical elements formed to reflect the image from the two projectors to the same design eye position.

6. An information display system for use in providing information displays, comprising:

(a) a holographic optical element including a hologram, the holographic optical element being substantially transparent to most wavelengths of light and formed to act as a diffuse reflector of light at a selected band of wavelengths such that light from the holographic optical element is reflected into a predetermined viewing zone bonded by predetermined left and right angles in a horizontal plane orthogonal to the plane of said holographic optical element and bounded by predetermined upper and lower angles in a vertical plane orthogonal to the plane of said holographic optical element; and (b) a projector mounted in position to produce an image at the selected band of light wavelengths which the holographic optical element reflects, and which projects and focuses the image onto the holographic optical element to provide the image at the predetermined viewing zone and such that observers outside of the predetermined viewing zone do not see the image, wherein the projector includes a light source, a condenser lens assembly for condensing the light from the source to a diffuse homogeneous beam, a transmissive light modulator unit which receives the beam and is addressable to provide a two-dimensional array of pixels which selectively modulate the light passed therethrough to provide an image in the light beam, and a focusing lens to focus the imaged light from the light modulator unit onto the holographic optical element;

wherein the holographic optical element is created by a step and repeat process to create a matrix from a master hologram, which is used to produce a single hologram in a scalable range of sizes forming the holographic optical element programmed to reflect light at the selected band of wavelengths into said predetermined view zone regardless of the physical size of the holographic optical element.

7. An information display system for providing information display on a window, said system comprising:

a light source for generating a beam of light;

a transmissive light modulator, disposed for illumination by said light source and responsive to control signals applied thereto, including a matrix of individually addressable pixels, the individual pixels being selectively rendered opaque to light passing though said light modulator in accordance with said control signals to create an image template of information on said beam of light;

a holographic optical element, disposed on said window to be illuminated by the information bearing light beam from said transmissive light modulator, the holographic optical element being substantially transparent to most wavelengths of light but operating as an amplifying diffuse reflector with respect to a predetermined band of wavelengths, amplifying and reflecting light within the predetermined band of wavelengths into only a predetermined viewing zone bounded by predetermined left and right angles in a horizontal plane orthogonal to the plane of said holographic optical element and bounded by predetermined upper and lower angles in a vertical plane orthogonal to the plane of said holographic optical element;

wherein said holographic optical element comprises at least two adjacently disposed component holographic optical elements formed to reflect light in the predetermined limited band of wavelengths at complementary angles.

8. An information display system for use in providing information displays on windows of a building comprising:

(a) a holographic optical element including a hologram mounted on a window of the building, the holographic optical element being substantially transparent to most wavelengths of light and formed to act as a diffuse reflector of light at a selected band of wavelengths such that the viewing window of the reflected image is controlled to prevent light from the holographic optical element from shining toward regions other than a selected design eye region; and (b) a projector mounted to a structure of the building to product an image at the selected band of light wavelengths which the holographic optical element reflects, and which projects and focuses the image onto the holographic optical element to provide the image at the design eye region and such that observers outside of the design eye region do not see the image;

wherein the building has multiple windows which provide different views to observers, wherein there are a plurality of holographic optical elements mounted to different windows so as to provide different views to an observer through the holographic optical elements and out the window, and a plurality of projectors each focusing an image onto a separate one of the holographic optical elements to provide images on such holographic optical elements which are appropriate to the views seen by the observer out the window through the holographic optical element.

9. An information display system for use in providing information displays on windows of a building comprising:

(a) a holographic optical element including a hologram mounted on a window of the building, the holographic optical element being substantially transparent to most wavelengths of light and formed to act as a diffuse reflector of light at a selected band of wavelengths such that the viewing window of the reflected image is controlled to prevent light from the holographic optical element from shining toward regions other than a selected design eye region; and (b) a projector mounted to a structure of the building to produce an image at the selected band of light wavelengths which the holographic optical element reflects, and which projects and focuses the image onto the holographic optical element to provide the image at the design eye region and such that observers outside of the design eye region do not see the image;

wherein there are plural holographic optical elements mounted to the window adjacent to one another and associated plural projectors projecting images to each of the holographic optical elements, each holographic optical element formed to reflect the image focused thereon to the same design eye region so that an observer in the design eye region will see the images from each of the holographic optical elements whereas the images will not be seen by observers outside the design eye region.

10. An information display system for use in providing information displays on windows of a building comprising:

(a) a holographic optical element including a hologram mounted on a window of the building, the holographic optical element being substantially transparent to most wavelengths of light and formed to act as a diffuse reflector of light at a selected band of wavelengths such that the viewing window of the reflected image is controlled to prevent light from the holographic optical element from shining toward regions other than a selected design eye region; and (b) a projector mounted to a structure of the building to produce an image at the selected band of light wavelengths which the holographic optical element reflects, and which projects and focuses the image onto the holographic optical element to provide the image at th design eye region and such that observers outside of the design eye region do not see the image;

wherein the holographic optical element is mounted on the window of the building by adhering the element to the window with a transparent adhesive; and wherein the adhesive is room temperature vulcanizing material which is applied to a back face of the holographic optical element adjacent edges of the element.

11. An information display system for use in providing information displays on windows of a building comprising:

(a) a holographic optical element including a hologram mounted on a window of the building, the holographic optical element being substantially transparent to most wavelengths of light and formed to act as a diffuse reflector of light at a selected band of wavelengths such that the viewing window of the reflected image is controlled to prevent light from the holographic optical element from shining toward regions other than a selected design eye region; and (b) a projector mounted to a structure of the building to produce an image at the selected band of light wavelengths which the holographic optical element reflects, and which projects and focuses the image onto the holographic optical element to provide the image at the design eye region and such that observers outside of the design eye region do not see the image;

wherein the window of the building has two holographic optical elements mounted thereon, one vertically higher than the other, and two projectors, one forming an image on the upper holographic optical element and the other forming an image on the lower holographic optical element, the holographic optical elements formed to reflect the image from the two projectors to the same design eye position.

* * * * *